United States Patent
Dauwalter

[11] Patent Number: 6,107,616
[45] Date of Patent: Aug. 22, 2000

[54] POWER FAILURE INTERRUPT RECOVERY FOR THE PENDULOUS OSCILLATING GYROSCOPIC ACCELEROMETER (POGA)

[75] Inventor: Charles R. Dauwalter, Newton Highlands, Mass.

[73] Assignee: Milli Sensor Ststems & Actuators, Inc., West Newton, Mass.

[21] Appl. No.: 09/261,326

[22] Filed: Mar. 3, 1999

Related U.S. Application Data

[60] Provisional application No. 60/076,686, Mar. 3, 1998.

[51] Int. Cl.[7] .......................... G01P 15/14; G01C 19/02
[52] U.S. Cl. .................. 244/3.2; 244/3.15; 702/141; 73/503; 73/503.3; 73/504.02; 73/514.36
[58] Field of Search ........................ 244/3.1, 3.15, 244/3.2, 3.21, 3.22; 73/489–492, 503.3, 504.02–504.09, 504.11–504.16, 510, 514.01, 514.36, 503; 702/141

[56] References Cited

U.S. PATENT DOCUMENTS

| | | | |
|---|---|---|---|
| 4,365,512 | 12/1982 | Woodruff | 73/503 |
| 5,130,937 | 7/1992 | Kumar et al. | 702/141 |
| 5,457,993 | 10/1995 | Sapuppo | 73/504.02 |
| 5,691,470 | 11/1997 | Sapuppo et al. | 73/504.02 |
| 5,712,426 | 1/1998 | Sapuppo et al. | 73/504.03 |
| 5,915,275 | 6/1999 | Cardarelli et al. | 73/504.03 |

*Primary Examiner*—Bernarr E. Gregory
*Attorney, Agent, or Firm*—Nields, Lemack & Dingman; Brian M. Dingman

[57] ABSTRACT

A system for protecting a pendulous oscillating gyroscopic accelerometer (POGA) from power failure interruption (PFI) events, the POGA having a servo driven member (SDM), rotor driven member (RDM), and torque summing member (TSM), wherein the POGA is a part of an accelerometer system of a guidance system which detects such events and communicates them to the accelerometer system. In the invention, the acceleration is stored just prior to the PFI induced system shut-down, and after the PFI the POGA drives are turned back on. The velocity change during the PFI is determined based on the TSM deflection occurring during the PFI event, acceleration existing at the beginning, and elapsed time. This is reported to the guidance system in a timely fashion.

6 Claims, 3 Drawing Sheets

POWER FAILURE INTERRUPT RECOVERY FOR THE PENDULOUS OSCILLATING GYROSCOPIC ACCELEROMETER (POGA)

CROSS REFERENCE TO RELATED APPLICATION

This application is a continuation in part of Ser. No. 60/076,686, Mar. 3, 1998.

BACKGROUND OF THE INVENTION

It is a requirement of strategic guidance systems that the accelerometers continue to deliver accurate velocity information in the face of expected Power Failure Interruptions (PFI). The PFI requires that sensitive electronic circuits be deactivated and protected in order to prevent damage during the PFI event. This interrupts normal operation of the accelerometers and prevents accumulating and reporting to the guidance system velocity gained during the PFI. To eliminate unacceptable velocity errors, the unreported velocity must be reconstructed from a combination of information saved in hard memory at the onset of the PFI event, and data available in the accelerometer system after the PFI event is over and normal operation re-established. The following describes accelerometer operation during and after the PFI event, and the invention concerns how the unreported velocity information is reconstructed and report to the guidance system at the next interrogation period.

POGA PFI Scenario Sequence of Events

Accelerometer system receives notice of the beginning of a PFI event

Critical data is stored in hard memory

Electronic circuits are placed in a "protect" mode, resulting in cessation of normal operation, loss of any of its stored data and protection of the circuits from potentially damaging events.

Accelerometer system receives notice of the end of the PFI event.

Accelerometer system placed in the recovery mode.
1. Critical data is recovered from hard memory
2. Normal operation is established
3. Velocity unreported during the PFI is computed; the unreported velocity includes the following:
   a. Velocity gained during the PFI due to vehicle acceleration existing at the time of PFI onset,
   b. Velocity gained during the PFI due to any changes during the PFI to the acceleration which existed at the time of PFI onset, and
   c. Velocity gained during normal operation after normal operation resumes after the PFI but before the next guidance system velocity interrogation.

At the next velocity interrogation command after the recovery to normal operation is complete, the accelerometer system delivers to the guidance system either:
1. The current measured velocity (in the case of a PIGA), or
2. The change in measured velocity since the last velocity interrogation before the PFI (in the case of a POGA).

Subsequent operation is normal.

Accelerometer Operation during PFI

The response to the cessation of normal operation during PFI of the POGA is as follows:

a) The magnitude of the angular momentum of the RDM begins to diminish exponentially with time (angular momentum is oscillating in the POGA).

b) The magnitude of the amplitude of motion of the SDM begins to diminish, also exponentially with time (SDM motion is oscillating in the POGA).

c) The net torque applied to the torque summing member (TSM) is the difference between the gyroscopic rebalance torque, and the product of the input acceleration and the pendulosity. In the POGA, the gyroscopic rebalance torque is $\theta_{SDM} \theta_{RDM} \cos(\Phi)$ where $\theta_{SDM}$ is the SDM oscillation amplitude, $\theta_{RDM}$ is the RDM oscillation amplitude and $\Phi$ is the phase angle between the oscillations. If there is no gyroscopic rebalance torque then, the TSM angular deflection is a measure of the velocity gained. Since the control loop is no longer operating to return the TSM to null, velocity information is stored in the Torque Summing Member (TSM); TSM angular deflection is proportional to stored velocity. This stored velocity information consists of two parts:

1. A real part due to any change in input acceleration from the value existing at the time of PFI, and
2. An erroneous (or "lost") part due to the decrease in either angular momentum or amplitude of SDM motion. (In the PIGA, the part due to decrease in angular momentum is negligible because of the negligible decrease in wheel speed, while the part due to decrease of amplitude of SDM rate is recovered once normal operation is resumed, due to the mechanical integration of the PIGA).

SUMMARY OF THE INVENTION

The subject invention relates to recovery from power failure in a POGA instrument. The POGA is disclosed in the following U.S. patents, each of which is incorporated herein by reference: U.S. Pat. Nos. 5,457,993, issued on Oct. 17, 1995; 5,691,470, issued on Nov. 25, 1997, and 5,712,426, issued on Jan. 27, 1998. The POGA has RDM and SDM members which move with periodic oscillations.

DESCRIPTION OF THE PREFERRED EMBODIMENT

POGA PFI Recovery General Strategy

Figure 1:
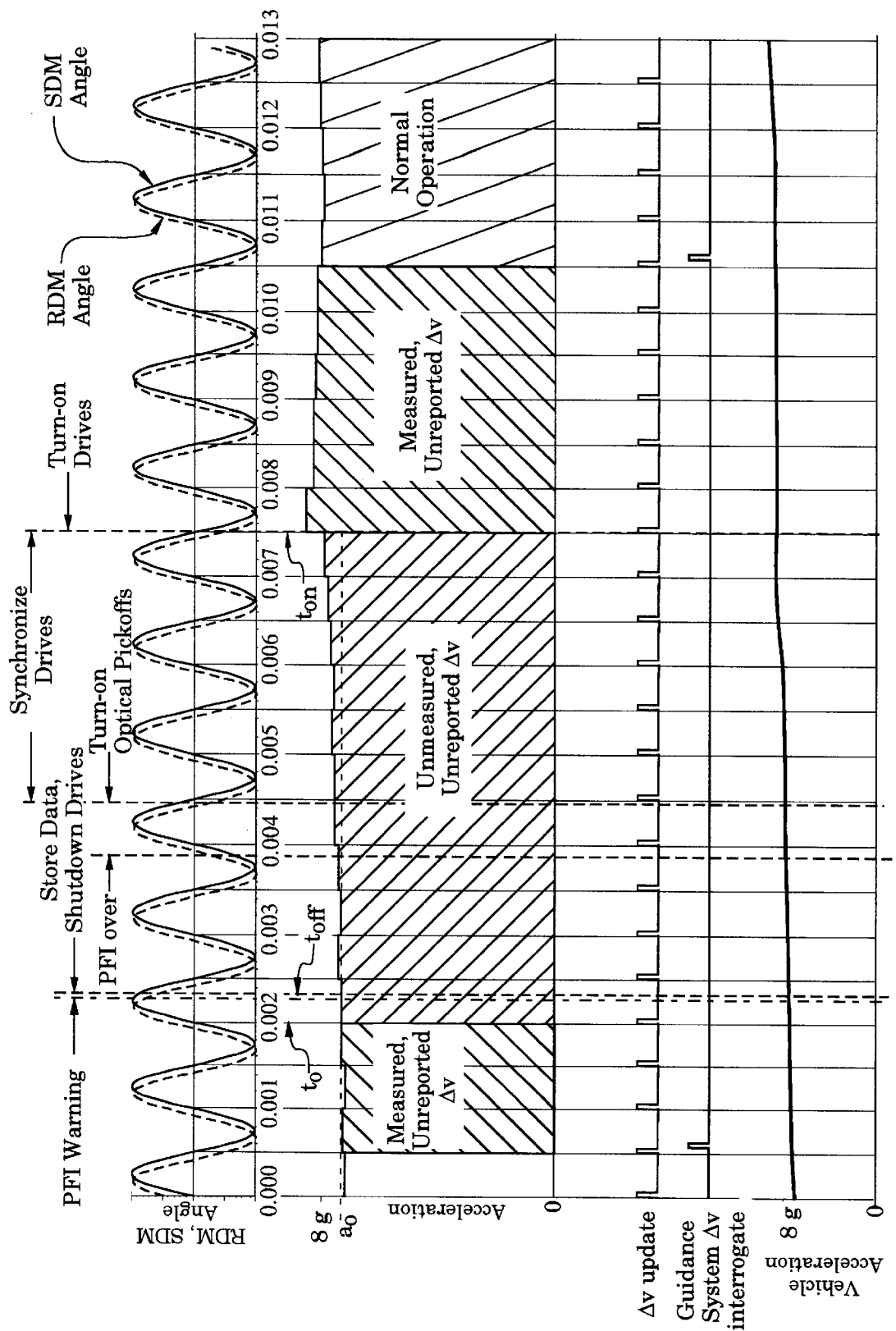
FIG. 1 is a graph of the operation of the POGA during a PFI event, illustrating the operation of the invention.
Figure 2:
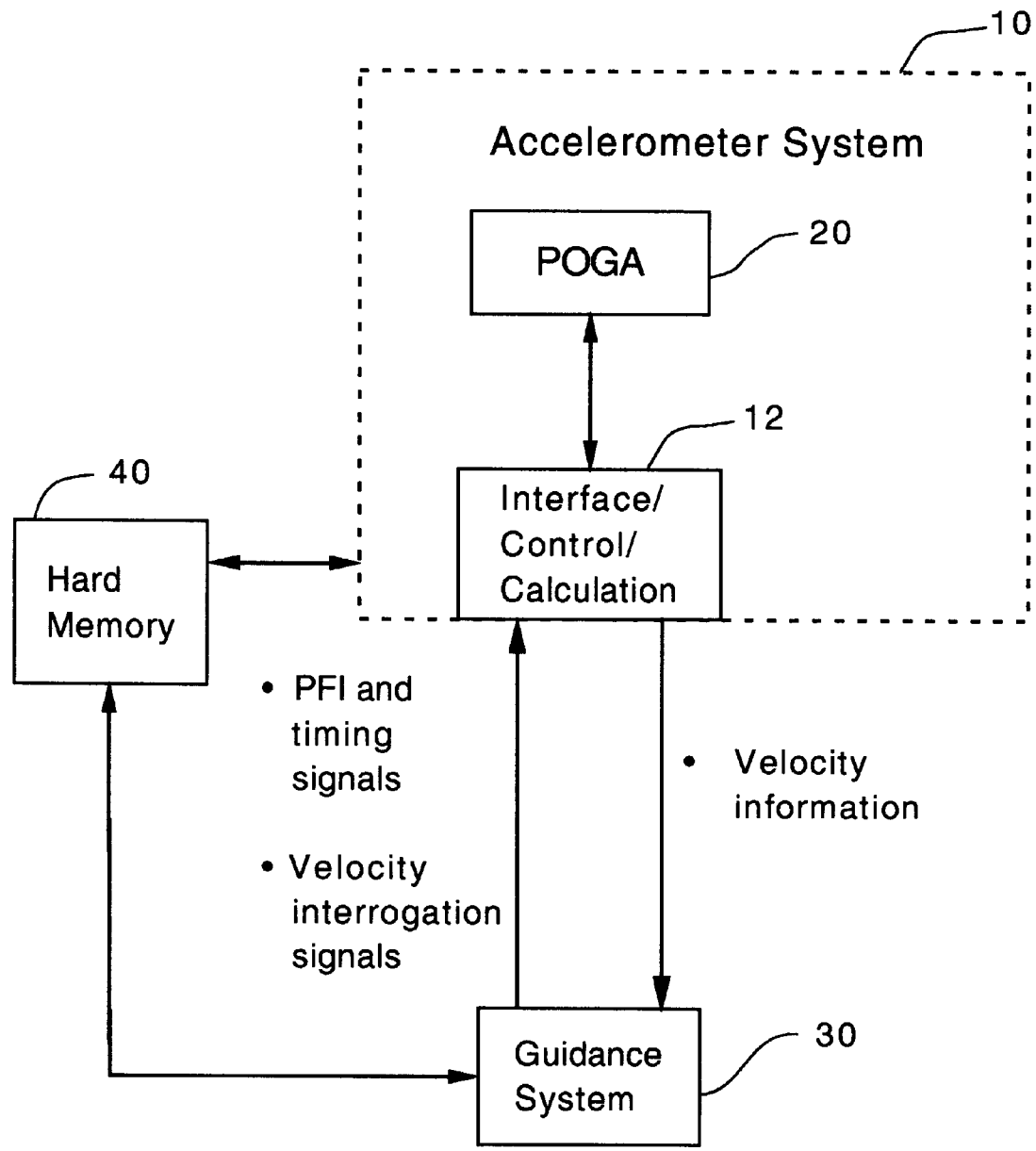
FIG. 2 is a block diagram of the accelerometer and guidance systems in a vehicle, useful in understanding the invention.

The general strategy to be used in the invention for recovery of velocity information following PFI for the POGA follows.

Assumed operating conditions
a) POGA (20) clock operates at 100 MHz and is frequency locked to the guidance system clock.
b) POGA operating frequency is 1,000 Hz., locked to the POGA (and, hence, guidance system) clock.
c) RDM damped natural frequency=1,000 Hz.
d) SDM damped natural frequency<1,000 Hz.; required value is a function of the Q of both the RDM and SDM.
e) Signals announcing the onset and end of each PFI are provided by the guidance system 30 to the accelerometer of system 10, which the POGA is a part,
f) Hard memory 40 is provided for the (limited amount of) critical information; this memory is free from upset during and immediately after the PFI.

The general strategy of the invention a) Upon notification of a PFI event, store critical values in local hardened memory. This information consists of the following:

1. Time of most recent guidance system velocity interrogation of the accelerometer system.
2. Most recent value, $a_o$, of measured acceleration. This may be either the most recent value itself, or the average of a number of preceding values; for simplicity of explanation, the most recent value itself is used here.
3. The time, $t_{off}$, at which the SDM and RDM drives are to be turned off (communicated by guidance system 30)

b) The POGA electronics are put in the protected mode at time $t_{off}$; this may include the TSM pickoff electronics, the control electronics and the signal processing electronics, as necessary depending upon damage susceptibility. Normal operation of the POGA ceases, but oscillations of the RDM and SDM continue. These undriven oscillations now are at the damped natural frequencies, rather than at the normal driven frequency, and the amplitudes of oscillation begin to decay exponentially. In the protected mode, the SDM and RDM driver torquers are preferably open-circuited to eliminate the energy dissipation and rapid amplitude decay that would otherwise occur.

c) When the end of PFI signal is received from guidance system 30, recovery of normal operation is initiated:

1. Optical pickoff and its electronics are turned on.
2. Signal processing electronics are turned on and achieve normal operation.
3. RDM and SDM torquer drive electronics are synchronized with the RDM and SDM motions; the RDM and SDM torquer back-EMFs may be used for this purpose. Synchronization is necessary so that, when the drivers are turned on, the drive signals will have the correct phase relationship with the motions (otherwise, the drivers could be, e.g., 180 degrees out of phase, and the amplitude would initially be driven towards zero rather than towards the correct value).
4. The RDM and SDM drives are activated and the TSM control loop is activated; the RDM and SDM amplitudes begin to return to normal values and the TSM angle begins to return to null. The time of activation of the drives (chosen to be an integral number of oscillation cycles after drive turn-off) is selected so that the effect of the decay of amplitude of oscillation is substantially (exactly if possible) offset by the change in phase during the off interval; consequently, the velocity information stored as TSM angle is substantially or exactly equal to the velocity gained due to any change in vehicle acceleration since onset of PFI. Subsequently, and until SDM and RDM amplitudes return to the normal values and TSM control loop null is achieved, the rate of change of the RDM/SDM phase is coordinated with the rate of change of the RDM and SDM amplitudes.
5. Signal processing electronics are initialized and begin acquiring data (This should be synchronized with the data processing so that the first value calculated is for the period beginning at the time when the RDM and SDM drives are activated and the TSM control loop is activated (4., above.))
6. Signal processing electronics 12 compute unreported velocity information for the time period between the last guidance system velocity update and actuation of the RDM and SDM drives and TSM control loop. This has a magnitude of $a_o (t_{on}-t_o)$
7. At the next guidance system interrogation, the signal processing electronics report the sum of the unreported velocity and the velocity gained since closing of the TSM control loop, this would include the velocity information stored in the TSM angle.
8. Normal operation continues. Any remaining velocity information stored in the TSM angle is eventually fully recovered as the TSM returns to its normal controlled position.

Computation of Unreported Velocity

The unreported velocity consists of the three parts described above:

a. Velocity gained due to acceleration, $a_o$, existing at the time of PFI onset, b. Velocity changes due to any changes during the PFI in the acceleration, $a_o$, existing at the time of PFI onset, and c. Velocity changes during the normal operation after the PFI and until the next guidance system velocity interrogation.

This unreported velocity is graphically depicted in FIG. 1.

Part a. is calculated from the acceleration value stored in hard memory at the onset of the PFI event and the elapsed time between the last reported velocity update and the time when the SDM and RDM drives are turned on ($t_{on}-t_o$ in FIG. 1). These times occur at zero amplitude crossings of the RDM so that an integral number of RDM/SDM cycles is included; this eliminates any errors from the oscillating component of inertial rebalance torque.

Part c. is accumulated just as in normal operation.

Part b., the difference between part a. and the actual velocity gained, is stored as TSM angular deflection. This is recovered when normal operation is resumed. However, the recovered velocity is not exactly correct due to two sources of error acting between the time when the SDM and RDM drives are turned off and the time when the oscillation amplitudes and phase have returned to the steady state values. This error is called the "lost velocity" and must be corrected to less than the accelerometer accuracy requirement. The two error sources are:

1) The exponential decrease, due to the energy loss caused by finite damping, of the amplitudes of SDM and RDM oscillation; this causes the inertial rebalance torque to exponentially decrease during this time period. The damping is small; expected Q ranges from 100 to 500.

2) The phase between the RDM and SDM oscillations begins to change from the value at drive removal, because the oscillation frequencies change from the drive frequency, $f_{drive}$, to the respective damped natural frequencies $f_{n_{RDM}}$ and $f_{n_{SDM}}$. The phase consequently changes at a rate 2 pi ($f_{n_{RDM}} - f_{n_{SDM}}$), causing the inertial rebalance torque to either increase or decrease, depending on the sign of the difference between the natural frequencies.

The equations for the corrections can serve as the basis for calculating the error from these two sources. However, it is possible, by proper design and fabrication of the POGA, to substantially reduce this error, relaxing the computational requirements, or even effectively eliminating the calculation for certain specific conditions.

Figure 3:
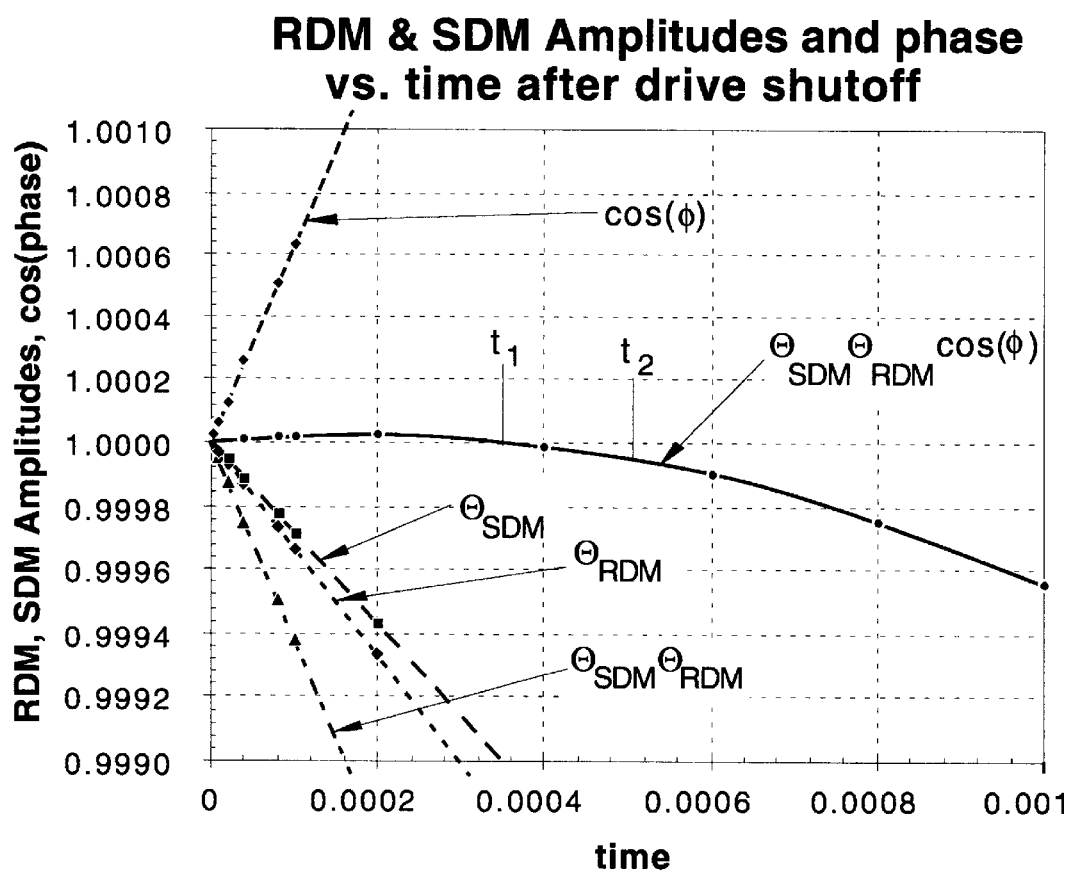
FIG. 3 is a graph detailing the compensation of amplitude and phase change errors during a PFI event, according to this invention.

Referring to FIG. 3, the amplitudes, $\theta_{RDM}$ and $\theta_{SDM}$, decay exponentially vs. time with time constants τRDM and τSDM, respectively. Φ is the phase angle between the RDM and the SDM. In the Figure, the changes are normalized with respect to the steady-state values and are greatly exaggerated to clearly show the effect. The product ($\theta_{RDM} \times \theta_{SDM}$) decays with time constant ($\tau$RDM+$\tau$SDM). It can be readily seen that if the phase angle rate of change is properly chosen, the amplitude and phase errors will exactly offset one another at a time, ($t_1$) in the Figure. At any time between t=0 and t=$t_1$, and for a considerable time beyond $t_1$, the error in indicated acceleration is very much smaller than that resulting from the decay of the SDM and RDM amplitudes. The error in the velocity gained under the action of $a_o$ (the acceleration at shutdown) is not zero at $t_1$ (in the example in FIG. 3, the indicated velocity gained (the time integrated indicated acceleration) is slightly larger at $t_1$ than the integrated value $a_o t_1$, but becomes identical at a slightly later time, $t_2$ in the Figure). Use could be made of this fact by making the time that the SDM and RDM drives are turned on ($t_{on}$ in FIG. 1) a predetermined and fixed time ($t_2$) after drive shutdown. This time delay would be chosen to be larger than the longest probable duration of a PFI event. In this way, any velocity change due to a difference between the actual acceleration history and the acceleration present at the onset of the PFI event, would be stored in TSM angular deflection, which is completely recovered when normal operation is resumed. This would eliminate error, and eliminate any need to calculate this portion of the missing velocity information.

POGA Design Considerations

Correct recovery from PFI as described in the above scenario requires that certain POGA parameters be realized in the fabrication of the device.

RDM or SDM damped resonant frequency must be set to the design oscillation frequency. The resonant Q need not be set to any precise value; it need only be within the design range, e.g., 450 to 550.

The damped resonant frequency of the other of the RDM and SDM must be set at a predetermined value; this value should be close, but not identical, to the resonant frequency of the first of the RDM and SDM. The required value depends upon the Qs of both the RDM and SDM, which would have to be measured in an immediately preceding assembly step.

The TSM damping and pickoff gaps must be large enough to allow the necessary velocity storage, and linearity of pickoff signal and independence of damping torque from TSM angular deflection are also required. Use of the above described technique of compensating for the amplitude of oscillation decay by a time dependent phase change of the free oscillations decreases the required linear range, thus providing greater design tradeoff flexibility.

Other embodiments will occur to those skilled in the art and are within the following claims:

What is claimed is:

1. A system for protecting a pendulous oscillating gyroscopic accelerometer (POGA) from power failure interruption (PFI) events, the POGA having a servo driven member (SDM), rotor driven member (RDM), and torque summing member (TSM), wherein said POGA is a part of an accelerometer system of a guidance system which detects such events and communicates them to said accelerometer system, in which at least one of said accelerometer system and said guidance system stores an acceleration value, wherein said POGA includes means for driving said SDM, means for driving said RDM, and means for detecting TSM angular deflection, said system for protecting comprising:

means for storing the acceleration value just prior to a PFI event;

means for shutting down during the PFI event said means for driving said SDM and said means for driving said RDM;

means for turning on, after the PFI event, said means for driving said SDM and said means for driving said RDM;

means, responsive to said means for detecting TSM angular deflection, for determining, after the PFI event, the velocity change during the PFI event; and means, responsive to said determined velocity change, and to said stored acceleration, for determining the velocity after the PFI event.

2. The POGA protection system of claim 1, further including means for synchronizing, after the PFI event, said means for driving said SDM and said means for driving said RDM with the motion of said SDM and said RDM so that said SDM and said RDM are driven with the correct phase relationship.

3. The POGA protection system of claim 1, in which said means for determining the velocity after the PFI event includes means for calculating, from said stored acceleration and the time between the last velocity measurement before the PFI event and the time when said SDM and RDM are turned on, the velocity change due to acceleration at the time it is stored just prior to the PFI event.

4. A method of tuning a system for protecting a pendulous oscillating gyroscopic accelerometer (POGA) from power failure interruption (PFI) events, the POGA having a servo driven member (SDM), rotor driven member (RDM), and torque summing member (TSM), wherein said POGA is a part of an accelerometer system of a guidance system which detects such events and communicates them to said accelerometer system, in which at least one of said accelerometer system and said guidance system stores an acceleration value, wherein said POGA includes means for driving said SDM, means for driving said RDM, and means for detecting TSM angular deflection, said method comprising:

establishing the resonant frequencies of the SDM and of the RDM such that, when the RDM and SDM are not driven during a PFI event of a known maximum duration, the change in inertial rebalance torque due to the decreased oscillation amplitude of the SDM and RDM substantially offsets the change due to the changing phase between the RDM and SDM oscillations, to decrease the error in determined velocity changes during the PFI event.

5. The POGA tuning method of claim 4, in which establishing the resonant frequencies includes adjusting the resonant frequency of at least one of said RDM and said SDM.

6. The POGA tuning method of claim 5, in which adjusting the resonant frequency includes changing the mass moment of inertia of at least one of the RDM and the SDM.

* * * * *